(12) United States Patent
Konishi et al.

(10) Patent No.: US 9,780,897 B2
(45) Date of Patent: Oct. 3, 2017

(54) OPTICAL TRANSMISSION APPARATUS AND OPTICAL RECEPTION APPARATUS

(71) Applicant: Mitsubishi Electric Corporation, Chiyoda-ku (JP)

(72) Inventors: Yoshiaki Konishi, Tokyo (JP); Kazuo Kubo, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/115,823

(22) PCT Filed: Jan. 13, 2015

(86) PCT No.: PCT/JP2015/050649
§ 371 (c)(1),
(2) Date: Aug. 1, 2016

(87) PCT Pub. No.: WO2015/133169
PCT Pub. Date: Sep. 11, 2015

(65) Prior Publication Data
US 2017/0012726 A1      Jan. 12, 2017

(30) Foreign Application Priority Data

Mar. 5, 2014  (JP) ................................ 2014-043149

(51) Int. Cl.
*H04B 7/212* (2006.01)
*H04J 3/16* (2006.01)
(Continued)

(52) U.S. Cl.
CPC .......... *H04J 3/1652* (2013.01); *H04J 3/0691* (2013.01); *H04J 3/07* (2013.01); *H04L 7/0075* (2013.01)

(58) Field of Classification Search
CPC .......... H04J 3/1652; H04J 3/0691; H04J 3/07; H04L 7/0075
See application file for complete search history.

(56) References Cited

U.S. PATENT DOCUMENTS 7,570,660 B1 *   8/2009   Fung ..................... H04J 3/0623
                                                              370/442
9,236,927 B2 *   1/2016   Stadelmeier ......... H04B 7/0689
(Continued)

FOREIGN PATENT DOCUMENTS

| WO | 2011-172001 A  | 9/2011  |
| WO | 2011/135726 A1 | 11/2011 |
| WO | 2012/077805 A1 | 6/2012  |

OTHER PUBLICATIONS

International Search Report and Written Opinion Issued Mar. 17, 2015 in PCT/JP15/050649 Filed Jan. 13, 2015.

*Primary Examiner* — Robert Wilson
(74) *Attorney, Agent, or Firm* — Oblon, McClelland, Maier & Neustadt, L.L.P.

(57) ABSTRACT

An optical transmission apparatus that accommodates client signals in a line signal, includes: an OPUn mapper unit that receives and maps the client signals; and a mapping control unit that determines the number of pieces of client data to be mapped to a payload portion and determines the timing to insert client data and information on the number of pieces of client data into the payload portion to control mapping performed in the OPUn mapper unit.

3 Claims, 3 Drawing Sheets

(51) Int. Cl.
*H04J 3/06* (2006.01)
*H04J 3/07* (2006.01)
*H04L 7/00* (2006.01)

(56) References Cited

U.S. PATENT DOCUMENTS

| | | | |
|---|---|---|---|
| 2003/0225802 A1* | 12/2003 | Ruthstein | H04J 3/062 |
| | | | 708/200 |
| 2007/0269218 A1* | 11/2007 | Zhang | H04J 3/1652 |
| | | | 398/140 |
| 2011/0262136 A1* | 10/2011 | Aisawa | H04J 3/076 |
| | | | 398/58 |
| 2013/0058643 A1 | 3/2013 | Honma et al. | |
| 2013/0259481 A1* | 10/2013 | Suzuki | H04J 14/0227 |
| | | | 398/66 |
| 2017/0012726 A1* | 1/2017 | Konishi | H04J 3/0691 |

\* cited by examiner

OPTICAL TRANSMISSION APPARATUS AND OPTICAL RECEPTION APPARATUS

FIELD

The present invention relates to an optical transmission apparatus and an optical reception apparatus.

BACKGROUND

There may be a demand in the future for optical transmission networks that use OTN (Optical Transport Network) to accommodate interfaces with low jitter, such as a CPRI (Common Public Radio Interface: wired interface between wireless base station and slave station) and a 3G SDI (3rd Generation Serial Digital Interface: 3rd generation analog video digital distribution interface). In protocols, such as PDH (Plesiochronous Digital Hierarchy), SDH (Synchronous Digital Hierarchy), and OTN, client signals are accommodated in a server signal using a different clock source by using an asynchronous accommodating method, such as stuffing synchronization, pointer synchronization, and GMP (Generic Mapping Procedure).

However, the problem with the asynchronous accommodating method is that low frequency jitter known as WTJ (Waiting Time Jitter) is generated due to the frequency difference between client signals and a server signal. With the asynchronous accommodating method, client signals are written in the payload portion of the server signal on the transmission side. At this point in time, because the client signal frequency (fClient) and the data rate of the server signal payload (fpayload) are asynchronous, they do not match each other. This causes a loss or insufficiency of data.

In order to prevent the loss or insufficiency of data, a stuff area is prepared in the server signal for making adjustments. The synchronizer on the transmission side compares the write address with the read address in the elastic store memory. When fClient is larger than fpayload, the synchronizer performs negative stuffing to extend the payload area. When fClient is smaller than fpayload, the synchronizer performs positive stuffing to reduce the payload. Thus, the amount of data in the client signals and that in the server signal are made equal to each other. On the reception side, data is extracted from the payload and is written in the elastic store memory, and a write counter is used to extract the original client signal timing, which is caused to pass through a PLL (Phase Locked Loop) in order to extract the smoothed original client signal frequency.

When the frequency difference between fClient and fpayload is small on the synchronizer side, the stuffing operation is performed with a low cycle. The bandwidth of a PLL is a few tens of Hz or higher; therefore, WTJ, which is low-frequency jitter components generated by performing a stuffing operation, cannot be removed.

An example of a measure against. WTJ is a method in which the synchronizer randomly changes the stuffing operation threshold in the elastic store memory. With this method, jitter components are intentionally changed to high-frequency components so that they can be removed in the subsequent PLL, thereby reducing the total number of jitter components. If the stuff generation frequency is low, low-frequency jitter is generated. Thus, the amount of stuff each time is preferably low. A technology is disclosed, for example, in Patent Literature 1 below, in which the de-stuffing timing is made random in order to reduce the amount of jitter.

CITATION LIST

Patent Literature

Patent Literature 1: Japanese Patent Application Laid-open No. 2011-172001

SUMMARY

Technical Problem

The above conventional technology, however, has a problem in that, with the stuff and de-stuff settings restricted by the OTU frame, there is a limit to the amount of jitter that can be reduced.

The present invention has been achieved in view of the above and an object of the present invention is to provide an optical transmission apparatus and an optical reception apparatus that can reduce low-frequency jitter components Solution to Problem In order to solve the above problems and achieve the object, an aspect of the present invention is an optical transmission apparatus that accommodates client signals in a line signal, including: a mapper unit that receives and maps the client signals; and a mapping control unit that determines a number of pieces of client data to be mapped to a payload portion and determines a timing to insert client data and information on the number of pieces of client data into the payload portion to control mapping performed in the mapper unit.

Advantageous Effects of Invention

The optical transmission apparatus according to the present invention has an effect that low-frequency jitter components can be reduced.

DESCRIPTION OF EMBODIMENTS

Exemplary embodiments of an optical transmission apparatus and an optical reception apparatus according to the present invention will be explained below in detail with reference to the drawings. This invention is not limited to the embodiments.

Embodiment

Figure 1:
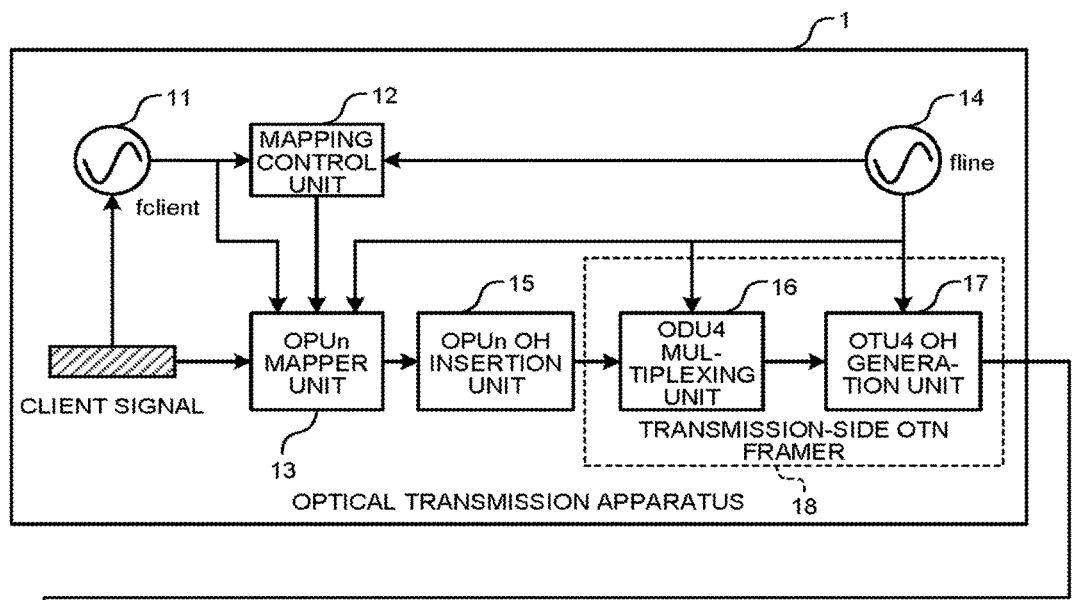
FIG. 1 is a diagram illustrating an example configuration of an optical transmission system that includes an optical transmission apparatus and an optical reception apparatus.
Figure 1:
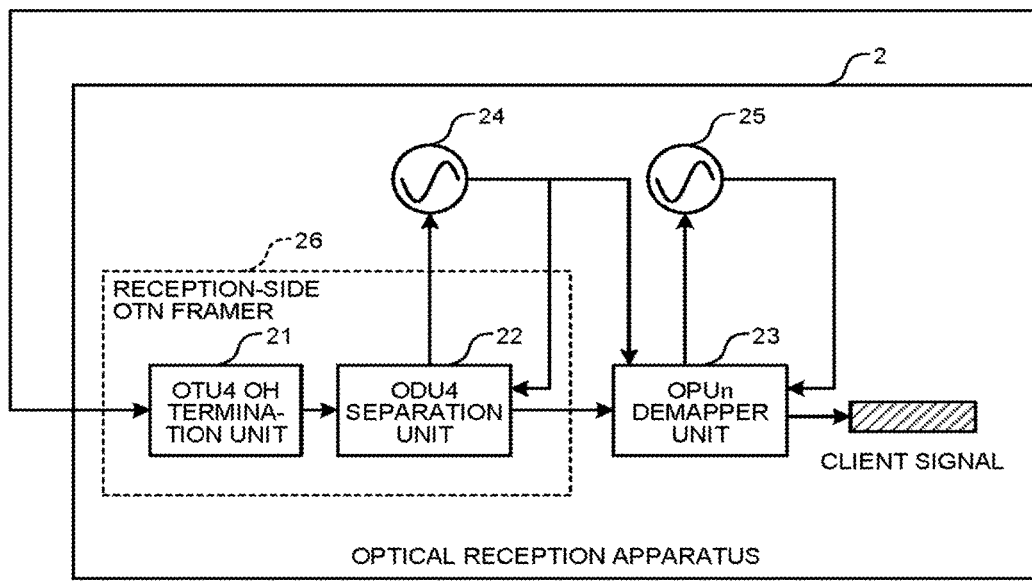

FIG. 1 is a diagram illustrating an example configuration of an optical transmission system that includes an optical transmission apparatus 1 and an optical reception apparatus 2 according to the present embodiment. The optical transmission apparatus 1 accommodates client signals in a line signal and transmits the line signal to the optical reception apparatus 2. The optical reception apparatus 2 receives, from the optical transmission apparatus 1, the line signal in which the client signals are accommodated and reproduces the client signals The optical transmission apparatus 1 includes a client extraction clock unit 11, a mapping control unit 12, an CPU (Optical channel Payload Unit) n mapper unit 13, a line transmitter 14, an OPUn overhead (OH) insertion unit 15, an ODU (Optical channel Data Unit) 4 multiplexing unit 16, and an OTU4 overhead (OH) generation unit 17. The ODU4 multiplexing unit 16 and the OTU4 OH generation unit 17 constitute a transmission-side OTN framer 18.

The client extraction clock unit 11 extracts a client signal clock (fclient) from client signals. The OPUn mapper unit 13 maps client signals. The mapping control unit 12 controls mapping performed in the OPUn mapper unit 13. The line transmitter 14 generates a line signal that Includes a line signal clock (fline). The OPUn OH insertion unit 15 inserts an overhead into the client signals mapped to the payload portion. The ODU4 multiplexing unit 16 multiplexes OPUns to obtain an ODU4 signal. The OTU4 OH generation unit 17 accommodates the ODU4 and provides an overhead and FEC (Forward Error Correction) to the ODU4 to generate an OTN frame.

The optical reception apparatus 2 includes an OTU4 overhead (OH) termination unit 21, an ODU4 separation unit 22, an OPUn demapper unit 23, a line extraction clock unit 24, and a client recovery clock unit 25. The OTU4 OH termination unit 21 and the ODU4 separation unit 22 constitute a reception-side OTN framer 26.

The OTU4 overhead (OH) termination unit 21 demaps the payload portion in the OTN frame. The ODU4 separation unit 22 separates client signals from the payload portion. The OPUn demapper unit 23 reproduces and outputs the client signals. The line extraction clock unit 24 extracts the line signal clock. The client recovery clock unit 25 recovers the client signal clock.

Next, an explanation will be given of an operation for transmitting an OTN frame from the optical transmission apparatus 1. In the optical transmission apparatus 1, first, client signals are written in the OPUn mapper unit 13. At this point in time, the client extraction clock unit 11 extracts a client signal clock (fclient) from the client signals and outputs the extracted client signal clock (fclient) to the OPUn mapper unit 13 and the mapping control unit 12.

The mapping control unit 12 receives the client signal clock (fclient) from the client extraction clock unit 11 and also receives the line signal clock (fline) from the line transmitter 14. The mapping control unit 12 then compares the clock phases (signal frequencies) of the client signals and the line signal to control mapping of the client signals (data) by adjusting the stuffing and de-stuffing processes. The stuffing and de-stuffing processes may be similar to those in the conventional technology.

On the basis of the result of the comparison of the clock phases (signal frequencies) of the client signals and the line signal, the mapping control unit 12 randomly determines the number of pieces of client data and the timing to insert the client data and the information on the number of pieces of client data into the payload portion in payload data mapping performed by the OPUn mapper unit 13. The number of pieces of client data indicates the number of client signals.

On the basis of the control performed by the mapping control unit 12, the OPUn mapper unit 13 performs the stuffing and de-stuffing processes by using the client signal clock (fclient) input from the client extraction clock unit 11 and the line signal clock (fline) input from the line transmitter 14. Furthermore, on the basis of the control performed by the mapping control unit 12, the OPUn mapper unit 13 maps the client data and the information on the number of pieces of client data to the payload portion.

As described above, in the present embodiment, the information on the number of pieces of client data is mapped to the payload portion together with the client data.

Figure 2:
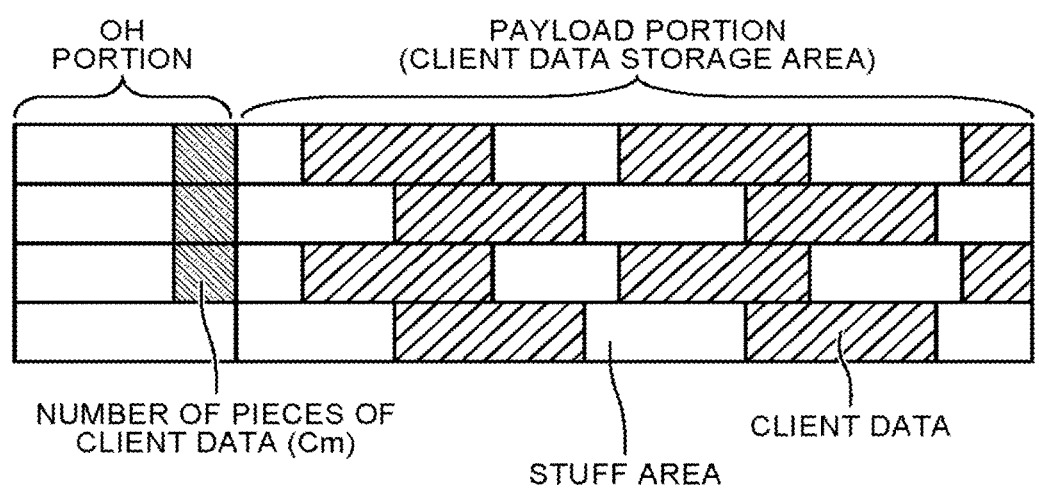
FIG. 2 is a diagram illustrating a conventional mapping state in an OPUn.
Figure 3:
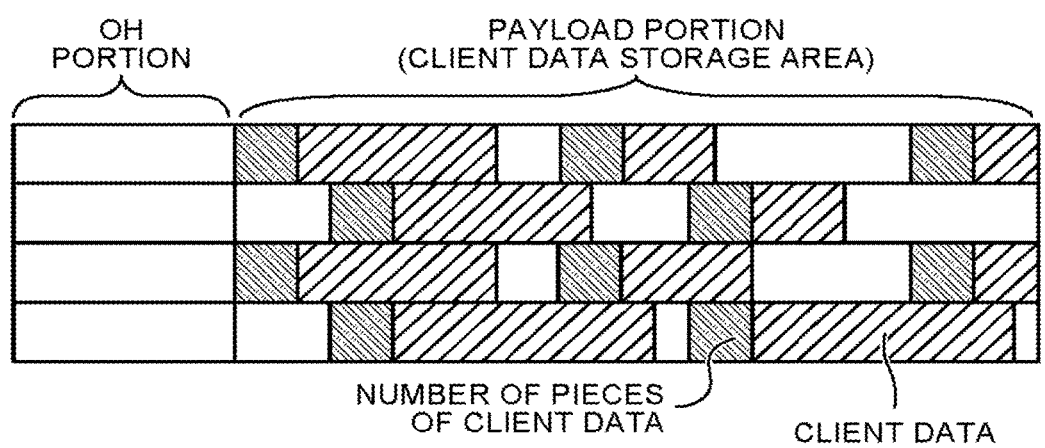
FIG. 3 is a diagram illustrating the mapping state in the present embodiment in an OPUn.
Figure 4:
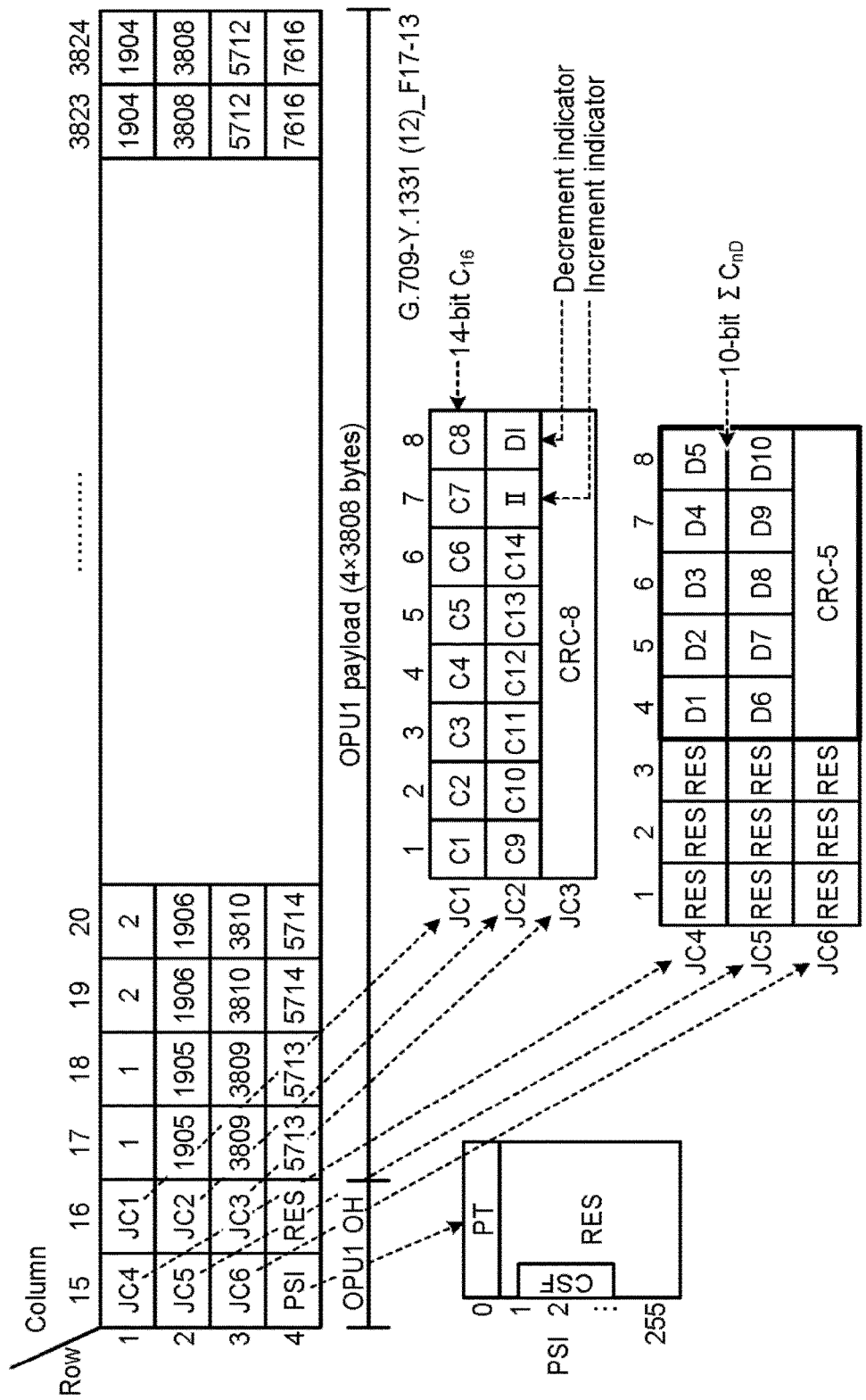
FIG. 4 is a diagram illustrating the definition of an overhead in GMP.

An explanation will be given of the state where the information on the number of pieces of client data and the client data are mapped. FIG. 2 is a diagram illustrating a conventional mapping state in the OPUn. In the conventional mapping state, in the OPUn, (information on) the number of pieces of client data (Cm) is inserted into the overhead (OH) portion, the client data is mapped to the payload portion, which is a client data storage area, and the stuff areas are disposed between the client data. FIG. 3 is a diagram illustrating the mapping state in the present embodiment in the OPUn. In the present embodiment, in the OPUn, (information on) the number of pieces of client data is mapped to the payload portion together with the client data. As is apparent from FIG. 3, (information on) the number of pieces of client data and the timing to insert the client data and the number of pieces of client data are random. FIG. 4 is a diagram illustrating the definition of an overhead in GMP. In FIG. 4, in the conventional technology, information on the number of pieces of client data is stored in the areas JC1, JC2, and JC3.

Upon receiving the output from the OPUn mapper unit 13, the OPUn OH insertion unit 15 inserts an overhead and outputs OPUns to the ODU4 multiplexing unit 16.

The ODU4 multiplexing unit 16 receives a line signal from the line transmitter 14, multiplexes the OPUns to obtain an ODU4 signal, inserts an overhead, and outputs the ODU4 signal to the OTU4 OH generation unit 17.

The OTU4 OH generation unit 17 receives a line signal from the line transmitter 14, accommodates the ODU to map it to the frame (OTN frame) for outputting signals to the transmission path, provides an overhead and FEC, and transmits the OTN frame to the optical reception apparatus 2. In such a manner, the optical transmission apparatus 1 accommodates client signals in a line signal and transmits the signal to the optical reception apparatus 2.

Next, an explanation will be given of an operation for receiving an OTN frame by the optical reception apparatus 2. In the optical reception apparatus 2, when the OTU4 OH termination unit 21 receives an OTN frame from the optical transmission apparatus 1, the OTU4 OH termination unit 21 removes the overhead and FEC from the OTN frame to demap the payload portion.

The ODU4 separation unit 22 separates the client signals including the client data and the number of pieces of client data from the demapped payload portion. At this point in time, the line extraction clock unit 24 extracts the original line signal clock (fline) from the payload portion extracted by the ODU4 separation unit 22 and outputs the extracted line signal clock (fline) to the ODU4 separation unit 22 and the OPUn demapper unit 23.

The OPUn demapper unit 23 receives the line signal clock (fline) from the line extraction clock unit 24 and uses the client data and the number of pieces of client data that are separated by the ODU4 separation unit 22 to reproduce the client signals on the basis of the client signal clock (fclient) that is recovered by the client recovery clock unit 25. The OPUn demapper unit 23 then outputs the client signals.

The ODU4 separation unit 22 and the OPUn demapper unit 3 receive the line signal clock (fline) from the line extraction clock unit 24. Because, on the optical transmission apparatus 1 side, the asynchronous accommodation operation equivalent to GMP is performed twice, i.e., (1) client signal→OPUn and (2) OPUn→ODU4, the line signal clock (fline) is used for the process of reproducing the client signals from the received OTN frame so that low-frequency jitter is not accumulated on the optical reception apparatus 2 side.

An example of a method of extracting and recovering clocks by the line extraction clock unit 24 and the client recovery clock unit 25 includes extracting a signal timing by using an eta tic store memory, a write counter, or the like in a de-synchronizer and obtaining the original signal frequency by causing the signal timing to pass through a PLL; however, it is not limited thereto and other methods may also be used.

With the above operation, the optical reception apparatus 2 can receive, from the optical transmission apparatus 1, a line signal in which client signals are accommodated and can reproduce the client signals.

As described above, according to the present embodiment, the optical transmission apparatus 1 randomly determines the timing to insert the client data and the number of pieces of client data, maps the client data and the number of pieces of client data to the payload, and transmits the client data and the number of pieces of client data. The optical reception apparatus reproduces client signals by using the client data and the number of pieces of client data that are separated from the payload. Thus, the interval at which the number I pieces of client data is updated can be shortened and the data size can have randomness. Therefore, it is possible to advance the timing at which asynchronous de-stuffing is performed and thus low-frequency jitter can be reduced.

INDUSTRIAL APPLICABILITY

As described above, the optical transmission apparatus and the optical reception apparatus according to the present invention are useful for optical communication and are particularly suitable for optical communication that uses a multi-level modulation and demodulation method that needs a bit rate of 100 G/s or higher.

REFERENCE SIGNS LIST 1 optical transmission apparatus, 2 optical reception apparatus, 11 client extraction clock unit, mapping control unit, 13 OPUn mapper unit, 14 line transmitter, 15 OPUn overhead insertion unit, 16 ODU4 multiplexing unit, 17 OTU4 overhead generation unit, 16 transmission-side OTN framer, 21 OTU4 overhead termination unit, 22 ODU4 separation unit, 23 OPUn demapper unit, 24 line extraction clock unit, 25 client recovery clock unit, reception-side OTN framer.

The invention claimed is:

1. An optical transmission apparatus that accommodates client signals in a line signal, the optical transmission apparatus comprising:
a mapper circuit that receives and maps the client signals; and
a mapping controller that determines a number of pieces of client data to be mapped to a payload portion and determines a timing to insert client data and information on the number of pieces of client data into the payload portion to control mapping performed in the mapper circuit to thereby reduce a low-frequency jitter in a transmitted optical signal including the client data and the number of pieces of client data.

2. The optical transmission apparatus according to claim 1, wherein, on a basis of a result of comparison of a frequency of the client signals and a frequency of the line signal, the mapping controller determines the number of pieces of client data and determines the timing to insert the client data and the information on the number of pieces of client data into the payload portion.

3. An optical reception apparatus comprising:
a receiver that receives an optical signal including client signals;
a separation circuit that separates a payload portion from a signal obtained by performing an overhead termination process on the optical signal;
a demapper circuit that reproduces the client signals by using client data and information on a number of pieces of client data that are included in the payload portion;
a line extraction clock circuit that extracts a frequency of the line signal from the payload portion and outputs the extracted line signal frequency to the separation circuit and the demapper circuit; and
a client recovery clock circuit that recovers a frequency of the client signal from the client data and outputs the recovered client signal frequency to the demapper circuit to reduce an effect of a low-frequency jitter in the received optical signal.

* * * * *